US006867050B2

(12) United States Patent
Peck et al.

(10) Patent No.: US 6,867,050 B2
(45) Date of Patent: Mar. 15, 2005

(54) APPARATUS AND METHODS FOR CHEMICAL SYNTHESIS

(75) Inventors: Konan Peck, Taipei (TW); Ji-Yen Cheng, Taoyuan (TW)

(73) Assignee: Academia Sinica, Taipei (TW)

( * ) Notice: Subject to any disclaimer, the term of this patent is extended or adjusted under 35 U.S.C. 154(b) by 401 days.

(21) Appl. No.: 09/923,464

(22) Filed: Aug. 6, 2001

(65) Prior Publication Data

US 2002/0176811 A1 Nov. 28, 2002

Related U.S. Application Data

(60) Provisional application No. 60/291,448, filed on May 16, 2001.

(51) Int. Cl.[7] .......................... G01N 1/10; G01N 21/00; G01N 15/06; B01L 3/02
(52) U.S. Cl. ........................ 436/180; 422/100; 422/57; 422/68.1; 422/81
(58) Field of Search ........................ 422/99–104, 68.1, 422/57, 81; 436/180

(56) References Cited

U.S. PATENT DOCUMENTS

| 4,353,989 A | 10/1982 | Bender et al. ............... 435/287 |
| 4,373,071 A | 2/1983 | Itakura ........................ 525/375 |
| 4,415,732 A | 11/1983 | Caruthers et al. ............. 536/27 |
| 4,458,066 A | 7/1984 | Caruthers et al. ............. 536/27 |
| 4,517,338 A | 5/1985 | Urdea et al. ............... 525/54.11 |
| 4,668,777 A | 5/1987 | Caruthers et al. ............. 536/27 |
| 4,671,941 A | 6/1987 | Niina et al. .................. 422/131 |
| 4,783,964 A | 11/1988 | Fanelli et al. ............... 60/547.1 |
| 4,973,679 A | 11/1990 | Caruthers et al. ............. 536/27 |
| 5,053,454 A | 10/1991 | Judd ........................ 525/54.11 |
| 5,112,575 A | 5/1992 | Saurel et al. ................ 422/116 |
| 5,123,418 A | 6/1992 | Saurel et al. ........... 128/662.03 |
| 5,132,418 A | 7/1992 | Caruthers et al. .............. 536/27 |
| 5,368,823 A | 11/1994 | McGraw et al. ............ 422/134 |
| 5,472,672 A | * 12/1995 | Brennan ...................... 422/131 |
| 5,529,756 A | 6/1996 | Brennan ..................... 422/131 |
| 5,541,314 A | 7/1996 | McGraw et al. ......... 536/25.31 |
| 5,866,342 A | 2/1999 | Antonenko et al. .......... 435/7.1 |
| 6,171,780 B1 | * 1/2001 | Pham et al. .................... 435/4 |

OTHER PUBLICATIONS

Adams et al., "Hindered Dialkylamino Nucleoside Phosphite Reagents in the Synthesis of Two DNA 51–Mers", J. Am. Chem. Soc 105:661–663, 1873.

Beaucage et al., "Deoxynucleoside Phosphoramidites–A new Class of Key Intermediates for Deoxypolynucleotide Synthesis", Tetrahedron Letters 22:1859–1862, 1981.

Lashkari et al., "An Automated Multiplex Oligonucleotide Synthesizer: Development of High–throughput, Low–cost DNA Synthesis", Proc. Natl. Acad. Sci. USA 92:7912–7915, 1995.

Rayner et al., "MerMade: An Oligodeoxyribonucleotide Synthesizer for High Throughput Oligonucleotide Production in Dual 96–Well Plates", Genome Research 741–747, 1998.

* cited by examiner

Primary Examiner—Jill Warden
Assistant Examiner—Brian R. Gordon
(74) Attorney, Agent, or Firm—Fish & Richardson P.C.

(57) ABSTRACT

Apparatuses and methods are described for parallel oligonucleotide synthesis of hundreds of different sequences and lengths at a time. Standard phosphoramidite chemistry is employed. The syntheses take place in a reaction plate compatible with the industrial standard microplate format to allow the use of readily available automated instruments for subsequent processing. Key parameters in reducing synthesis volume in small reaction wells are discussed. This invention provides solutions to the difficulties of low volume, high number synthetic reactions.

13 Claims, 7 Drawing Sheets

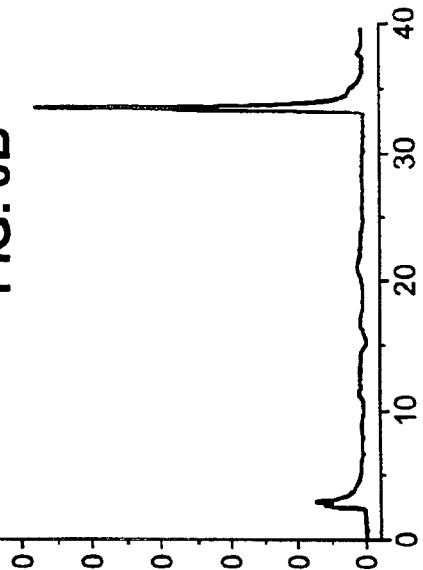
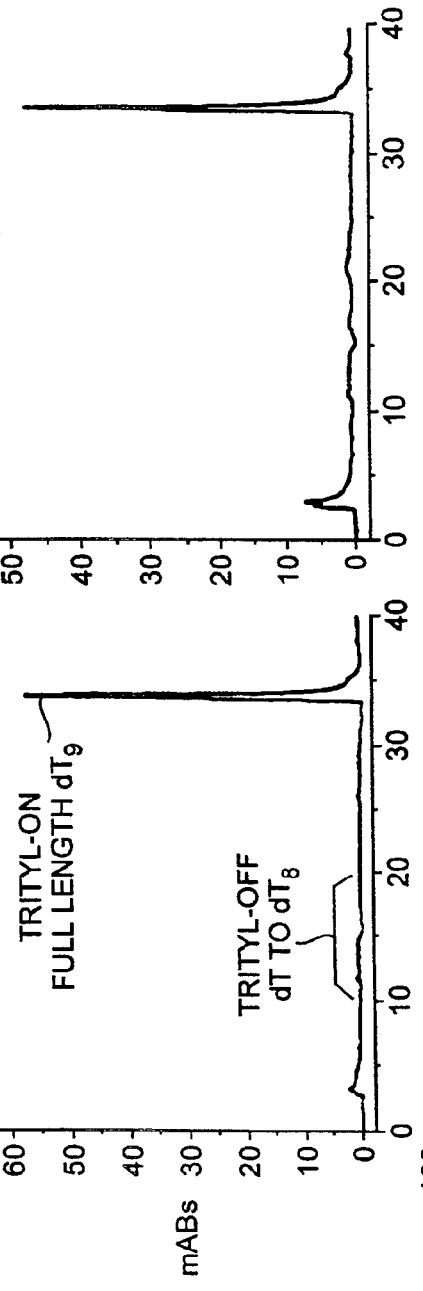

APPARATUS AND METHODS FOR CHEMICAL SYNTHESIS

Pursuant to 35 USC § 119(e), this application claims the benefit of prior U.S. provisional application No. 60/291,448, filed May 16, 2001.

TECHNICAL FIELD

This invention relates to an apparatus and method for chemical synthesis, and more particularly to an apparatus and methods for large parallel chemical synthesis.

BACKGROUND

Synthetic biopolymers such as oligonucleotides play a pivotal role in many fields such as molecular biology, forensic science, and medical diagnostics. In recent years, the demand for synthetically produced oligonucleotides has risen markedly because many genetic research projects require large number of oligonucleotides as PCR primers or gene probes. For instances, genetic polymorphism identification and scoring, STS content mapping, radiation hybrid mapping, primer walking in DNA sequencing, the Human Genome Project, and others, all require a large variety of oligonucleotides. With the emergence of massively parallel analysis technologies such as DNA microarrays, new demands for large variety of oligonucleotides have evolved.

With the completion of sequencing the genome of model organisms and the human genome project, a large number of gene specific probes or PCR primers are needed to amplify all the genes in an organism for studying the functions, cellular roles, and other characteristics of genes. For instances, *Drosophila melanogaster*, the fruit fly, has around 14,000 genes and *C. elegans* has around 18,000 genes. To amplify all the *Drosophila* genes in its genome requires around 28,000 PCR primers. Current throughput of available oligonucleotide synthesizer technologies take a synthesizer about 6 months to complete the synthesis of all the gene specific PCR primers for the above organisms

SUMMARY

In general, the invention features an apparatus and method for improving the throughput of chemical syntheses by increasing the number of parallel syntheses. The synthetic method and apparatus of this invention facilitates increased parallel synthesis by providing a reaction plate having a higher density of synthesis reaction wells, such as 384 or 1,536 wells, relative to currently available synthetic reaction well densities. Simultaneously it alleviates synthesis problems such as cross contamination among neighboring reaction wells, large variation of yields between reaction wells, spattering of reaction agents and synthesis supports. The invention also reduces the cost for producing a large variety oligonucleotides relative to current synthesis methods by providing an apparatus and method for performing large parallel synthesis on a lower reaction scales, such as less than 40 nanomole relative to current synthesis methods.

In one aspect the invention features an apparatus for chemical synthesis having a plate with a plurality of wells and a supply assembly including at least one valve for dispensing fluids through a nozzle. The valves and nozzles together are configured to provide fluids to the wells in volumes as small as about 2 microliters. Each of the wells defines a bore extending from a first end to a second end of each well, includes a synthesis retaining medium disposed within the well between the first and second ends and has an opening at the first end having an inner diameter of about 3.5 mm or less (e.g., 2.5 mm or less), an inner diameter at the synthesis retaining medium closest to the second end of about 3.0 mm or less (e.g., 2.0 mm or less), and each of the wells are arranged in a 2-dimensional array such that the wells are spaced apart from neighboring wells by about 4.5 mm or less.

Embodiments of this aspect can include one or more of the following. The apparatus further includes a controller programmed to determine a dispersing pressure for dispensing fluids through the nozzle based upon a coefficient of variation of the dispersed fluids as a function of the dispersing pressure and a synthesis support scattering height as a function of the dispersing pressure. The syntheses are carried out on synthesis supports retained by a porous medium such as a membrane. The apparatus further includes a pumping assembly in communication at the second ends of the wells for applying a vacuum thereto, in which the membrane has a bubble point pressure higher than the vacuum to be applied. For example, vacuum of 10 in. Hg vac is used for the drainage while membrane with bubble point pressure of 36.5 in. Hg is used for CPG (controlled pore glass) bead retaining. In this combination, membrane bubble point pressure is higher than the applied vacuum so that no gas flow through membrane is allowed during fluid drainage. The wells have a gas flow rate in liters per minute less than the pumping rate of the pumping assembly. The gas flow rate should be less than one half ($<\frac{1}{2}$) of the pumping rate so that the vacuum in the pumping assembly is maintained to greater than one half ($>\frac{1}{2}$) of the initial value and reasonable pumping time is maintained.

The apparatus further includes a controller programmed to conduct chemical synthesis in the wells on a reaction scale of less than about 20 nanomoles and less than about 10 nanomoles (e.g., 5 nanomoles). The plate includes more than about 100 wells. The apparatus further includes three additional plates, in which each of the three additional plates includes more than about 100 wells. The nozzle is made from a material having a surface energy of about 20 dynes/cm or less (e.g., Teflon®) and has a de-burred tip.

In another aspect, the invention features a method of conducting parallel chemical synthesis including determining a dispersing pressure for dispensing fluids through a supply assembly into reaction wells of a synthesis apparatus based upon a coefficient of variation for each dispersed fluid as a function of the dispersing pressure and a synthesis support scattering height in the wells for each dispersed fluid as a function of the dispersing pressure.

Embodiments of this aspect can include one or more of the following. The method further includes selecting reaction wells having a synthesis retaining medium such that the wells have a gas flow rate in liters per minute less than a pumping rate of a pumping assembly of the synthesis apparatus. The method further includes dispensing a plurality of reactants via the supply assembly into a plurality of wells of a parallel synthesis plate. Each of the wells defines a bore extending from a first end to a second end of each well, includes the synthesis retaining medium disposed within the well between the first and second ends, and has an opening at the first end having an inner diameter of about 3.5 mm or less (e.g., 2.5 mm or less), an inner diameter at the synthesis retaining medium closest to the second end of about 3.0 mm or less (e.g., 2.5 mm or less), and each of the wells are arranged in a two-dimensional array such that the wells are spaced apart from neighboring wells by about 4.5 mm or less. The supply assembly includes at least one valve for dispensing fluids through a nozzle. The valve and nozzle together are configured to provide fluids to wells in volumes as small as about 2 microliters. The nozzle is made from a material having a surface energy of about 20 dynes/cm or less and has a de-burred tip. The syntheses are carried out on synthesis supports retained by a porous medium such as a membrane. The membrane is hydrophilic. The method further includes draining each of the wells via a pumping assembly, in which the pumping assembly is in communication at the second end of the wells for applying a vacuum thereto. The membrane has a bubble point higher than the applied vacuum. The method further includes performing chemical synthesis in the wells on a reaction scale of less than about 20 nanomole and less than about about 10 nanomole (e.g., at about 5 nanomole). The method further includes performing chemical synthesis in parallel in more than about 100 wells, more than about 300 wells, or more than about 1,000 wells.

Embodiments of the invention may include one or more of the following advantages. The present invention provides reduced synthesis failure, amount of waste, synthesis yield variation among reaction wells, and loss of the synthesis support (CPG) due to support spattering and leakage through the retaining medium. Disastrous effects occur when synthesis support spattering occurs. For example, the product yield in reaction wells having support spattering may be zero, the spattered support may block the vacuum assembly or create an over-bleeding of vacuum in the reaction wells thereby inhibiting drainage of other reaction wells. The invention exhibits minimal synthesis failure which, in turn, makes the apparatus and method more reliable. The invention provides a synthesis reaction plate having the same overall dimensions as currently available reaction plates but with higher density of reaction wells. The invention also reduces minute variations of reagent volume dispensed into the reaction wells and variations in the drain rate in each reaction well. Variations in drain rate of the reaction wells can have destructive effect in that only certain wells, those which drain faster relative to other reaction wells on the plate, are available for subsequent synthetic steps. The apparatus and method reduce costs by facilitating chemical synthesis at reduced reaction scales. Reduced reaction scales result from the invention's ability to dispense reduced volumes, e.g., less than about 10 microliters, of reagent into the reaction wells. For instance, reduced reagent consumption can be crucial in high-throughput synthesis, such as in oligonucleotide synthesis, in which expensive phosphoramidites containing reagents, e.g., terminal labeling reagents, modified bases, RNA phosphoramidites, and spacer groups, are needed.

The details of one or more embodiments of the invention are set forth in the accompanying drawings and the description below. Other features, objects, and advantages of the invention will be apparent from the description and drawings, and from the claims.

DESCRIPTION OF DRAWINGS

FIGS. 8A–D are HPLC plots of oligonucleotides produced via the apparatus of FIG. 1.

DETAILED DESCRIPTION

In general, the invention features an apparatus and method of improving synthesis throughput of an automated chemical synthesizer by increasing the number of parallel syntheses successfully completed. The synthetic method and apparatus of this invention facilitates increased parallel synthesis by providing a reaction plate having a higher density of synthesis reaction wells, such as 384 or 1,536 wells, relative to currently available synthetic reaction well densities while simultaneously reducing synthesis problems such as cross contamination among neighboring reaction wells, large variation of yields between reaction wells, spattering of reaction agents and synthesis supports, and loss of synthesis supports. The invention also reduces the cost for producing a large variety oligonucleotides relative to current synthesis methods by providing an apparatus and method for performing large parallel synthesis on a lower reaction scales, such as less than 40 nanomole relative to current synthesis methods. For example, the apparatus and method can perform parallel chemical synthesis on reaction scales of less than about 20 nanomole and less than about 10 nanomole (e.g., at about 5 nanomole).

Figure 1:
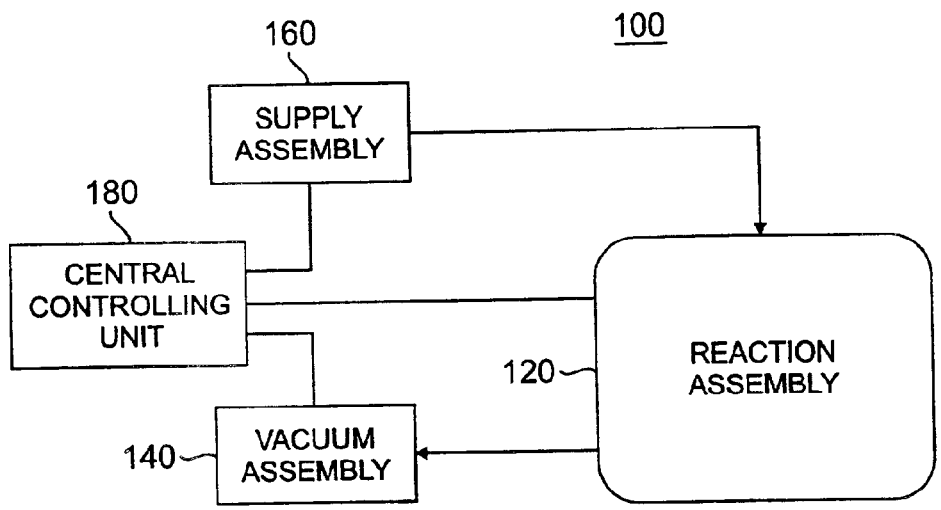
FIG. 1 is a schematic diagram of a parallel synthesis apparatus.

Referring to FIG. 1, an apparatus 100 includes a reaction assembly 120, a vacuum assembly 140, a supply assembly 160, and a central controlling unit 180. Central controlling unit 180 sends electronic signals to various components of apparatus 100 to perform parallel chemical syntheses by dispersing reactants via supply assembly 160 into reaction assembly 120 and draining waste fluids from the reaction assembly via vacuum assembly 140.

Figure 2:
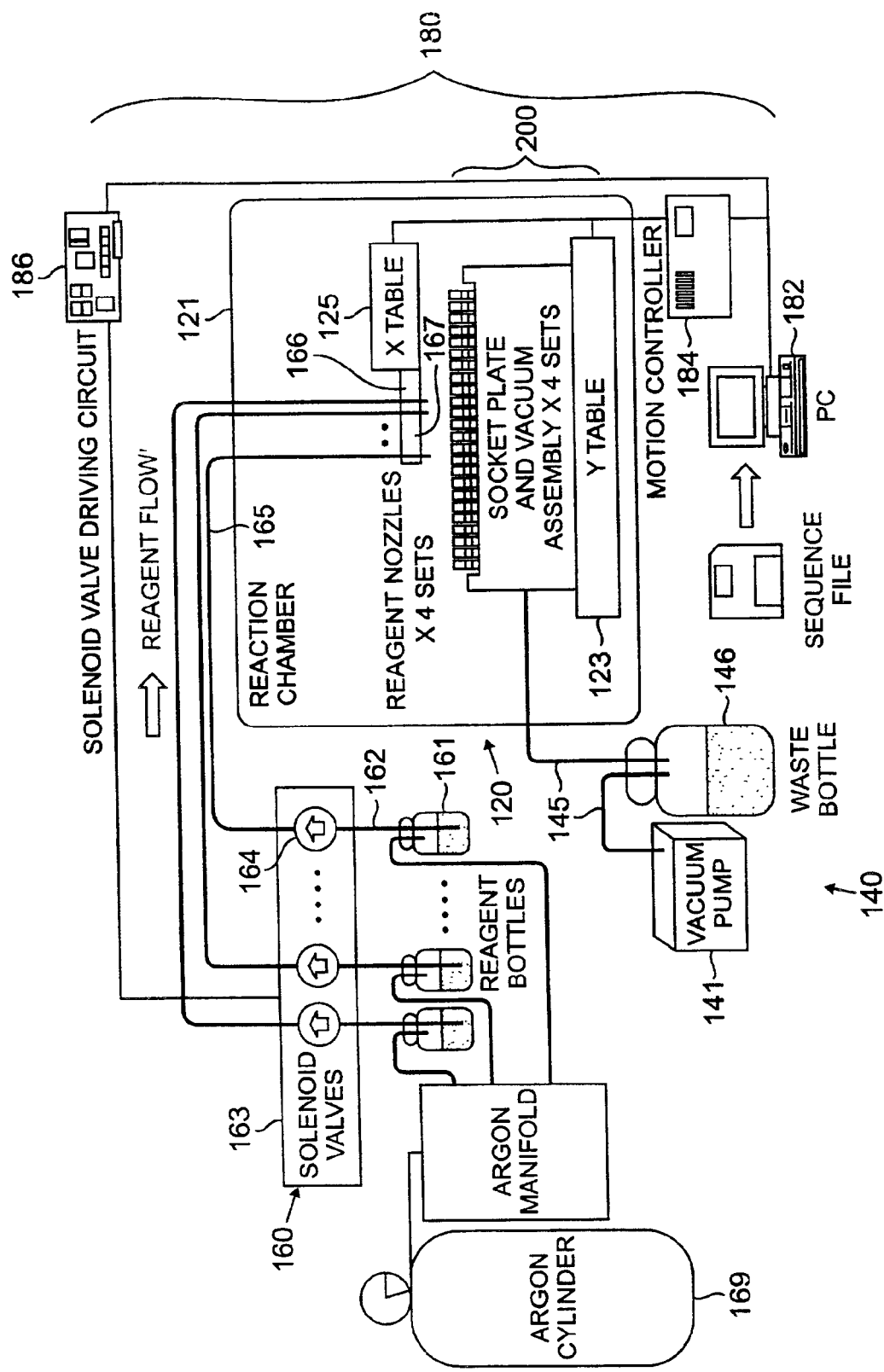
FIG. 2 is a more detailed schematic diagram of the apparatus of FIG. 1.

Referring to FIG. 2, reaction assembly 120 includes a reaction chamber 121 for housing a plate assembly 200, which is discussed in greater detail below. Plate assembly is mounted on a translatable stage 123. Reaction chamber can be pressurized with an inert gas to remove any atmospheric components, such as $H_2O$ and $O_2$, that may interfere or contaminate the parallel chemical syntheses. Supply assembly 160 includes reagent bottles 161 for holding reagents, e.g., solvents and reactants, for use in plate assembly 200. Each bottle is pressurized with an inert backing gas 169, such as argon. A tubing 162 extends from each bottle to a valve 164 within manifold 163. Supply tubing 165 extends from manifold 163 into a dispensing manifold 166 mounted on a translatable stage 125 in reaction chamber 121. Dispensing manifold 166 includes a plurality of nozzle tips 167, each one for delivering a specific reagent to plate assembly 200. The manifold can contain as many nozzles, such as 20, as there are reagents. Vacuum assembly 140 includes a pump 141 in fluid communication with a waste container 146 and plate assembly 200 via tubing 145. Central controlling unit 180 includes a central processing unit (CPU) 182, a motion controlling module 184, and a valve module 186.

During operation, CPU 182 sends electronic signals to motion controlling module 184 and a valve module 186 to dispense specific reagents into specific portions of plate assembly 200. Valve module 186 can simultaneously dispense one reagent via a nozzle tip at one site on plate 200 and other reagents via other nozzles to other sites on the plate. The same reagent can be dispensed to different sites on plate assembly 200 by motion controlling module 184 that activates translatable stages 123 and 125 to reposition the dispensing manifold and plate assembly. In general, translatable stages 123 and 125 propagate perpendicular to each other in one dimension, e.g., dispensing manifold translates in the x-direction and plate assembly translates in the y-direction. Depending upon the exact chemical synthesis being performed at each site on plate 200, CPU 182 via the module 186 and the characteristics of the nozzle tips can dispense reagents in volumes as small as about 2 microliters. If necessary, after each chemical step, CPU 182 sends electronic signals to activate pump 141 to drain waste materials from plate 200 into waste container 146. Dispensing small volumes of reagents facilitates reaction scales of less than about 20 nanomole and less than about 10 nanomole (e.g., at about 5 nanomole) and reduces cost associated with generating excess waste material. In general, the total volume of the reaction solutions can be less than 16 $\mu$l and still provide efficient mixing. To ensure consistent delivery of microliter volumes, the valves in manifold 163, typically, have a fast valve operation time, which, in turn results in higher reagent injection rate. An example of a valve having a suitable operation time is a miniature solenoid valve available from The Lee Company as part number LFVX050840A. In general, module 186 sends control signals to operate the valves at a reagent injection rate higher than about 20 Hz. Dispensing small volumes consistently depends not only on the valves and module 186, but also on the characteristics of the nozzle tip.

The characteristics of the nozzle tip are selected to minimize accumulation of residual reagent on the nozzle tip after each ejection. The nozzle tips are blunt-cut tubes having an inner diameter of about 0.03 inch or less. The tubes are made from low surface energy materials, such as Teflon. Low surface energy materials have a surface energy of about 20 dynes/cm or less. Low surface energy material helps to minimize the amount of reagent accumulation at the nozzle tip. De-burring the blunt-cut end also can reduce reagent accumulation at the tip. Non-de-burred ends include sharp edges and defects that cause reagent accumulation. Blunt-cut tips can be de-burred by heating the tubing at the tip. After de-burring, no sharp edges remain at the nozzle tip, the smooth surface of the nozzle tip minimizes reagent accumulation during reagent ejection. Reducing the reagent accumulation facilitates consistent dispensed reagent volumes and reduces cross contamination between different reaction sites on plate assembly 200.

Figure 3:
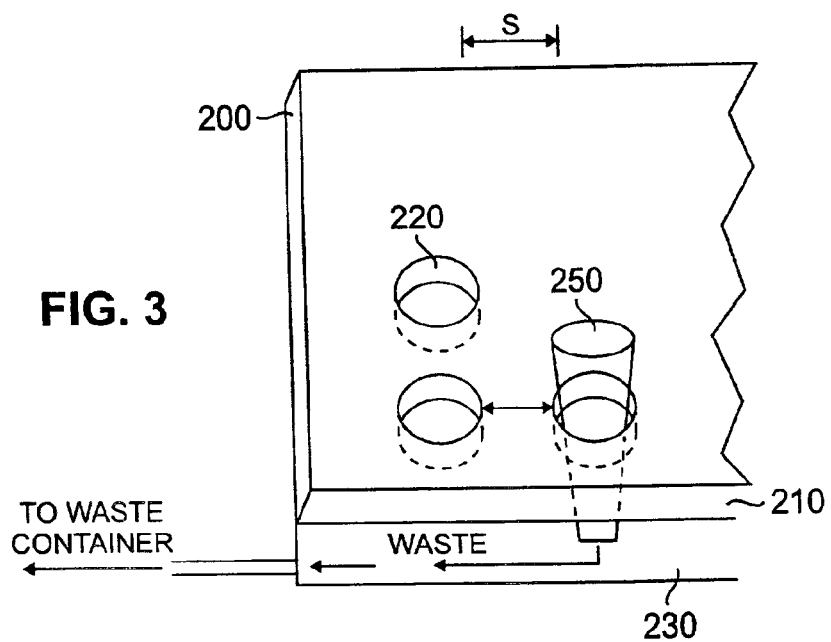
FIG. 3 is an expanded schematic diagram of a plate assembly of the apparatus of FIG. 1.
Figure 4:
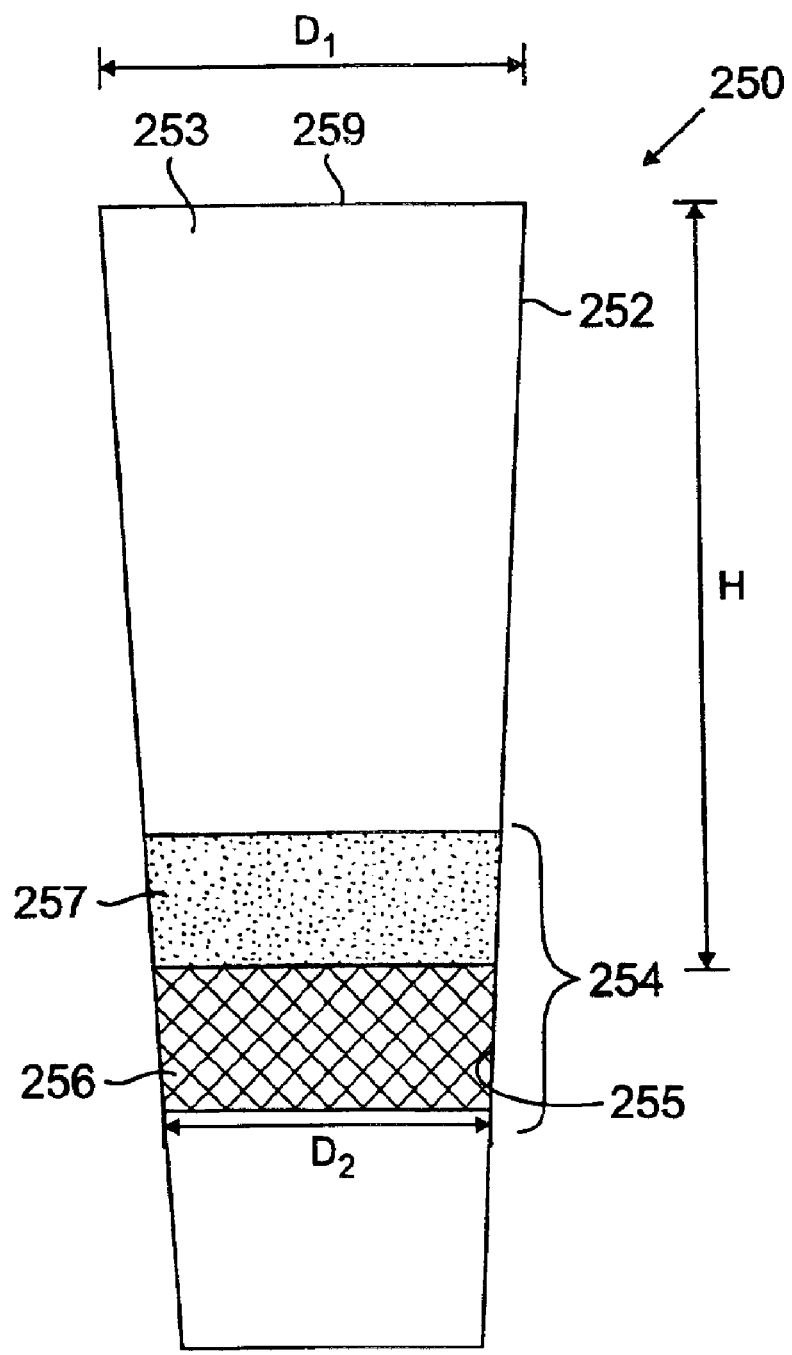
FIG. 4 is an expanded schematic diagram of a reaction well.

Referring to FIG. 3, plate assembly 200 includes a plate 210 having a plurality of openings 220 arranged in a 2-dimensional array. A reaction well 250 is disposed in each opening 220 such that the well tightly engages the inner surface of opening 220. The plate is sealed on a drain manifold 230 such that waste materials in the reaction wells flow through the manifold and into waste container 163. Plate 210 has dimensions of about 128 mm×85 mm×15 mm for length, width, and height, respectively. Depending upon the number of desired parallel syntheses, plate 210 includes more than about 100 openings or more than about 300 openings. For example, the plate can include 384 openings. The openings, typically, are spaced apart from the nearest neighboring openings by a center-to-center distance, S, of about 4.5 mm or less. The reaction wells, shown in expanded view in FIG. 4, include a conical body 252 and a synthesis reaction medium 254. The synthesis reaction medium is disposed in a bore 253 defined by conical body 252 and includes a synthesis support 257 disposed on a membrane 256. Membrane 256 is secured to an inside wall 255 of the conical body. Conical body 252, typically, has an inner diameter, $D_1$, at opening 259 of about 3.5 mm or less (e.g., 2.5 mm or less) and an inner diameter, $D_2$, wherein the membrane attaches to the body wall of about 3.0 mm or less (e.g., 2.5 mm or less). For example, $D_1$ can be about 2.2 mm and $D_2$ can be about 2.0 mm. The height, H, between the larger opening and the membrane is pre-selected such that the synthesis support remains in the conical body when dispensing the reagents at the required reagent injection velocity. As will be discussed in greater detail below, the CPU calibrates the apparatus for a given set of reagents to determine the desired operating pressures for dispensing the reagents and the minimum H required for those operating pressures.

An important factor in enhancing synthesis quality is the design of the reaction wells. In a shallow reaction well, i.e., small H, the synthesis support, such as controlled pore glass (CPG) beads, is prone to be flushed out during reagent delivery. In deeper, narrower reaction wells, gas bubbles are easily formed and trapped by surface tension, resulting in interference with reagent flow and yield variation or synthesis failure. A suitable reaction well profile retains the synthesis support despite possible splattering from reagent delivery and provides bubble-free reagent delivery. A reaction well with a suitable internal diameter is also important for high quality synthesis. Smaller internal diameters reduce reagent consumption, but can lead to bubble formation due to the surface tension. Large well diameter results in the consumption of larger reagent volume to achieve the reagent level height for adequate mixing and reaction.

The conical body can be manufactured from any material that does not interfere with the chemical synthesis being conducted by the apparatus. For example, the conical body can be made from a polymer, such as polypropylene or Teflon, or a metal, such as aluminum. The synthesis support can be made from any material, such as organic and inorganic polymers, that does not interfere with the chemical synthesis. For example, the synthesis support can be a CPG bead on which chains of oligonucleotides are grown. U.S. Pat. No. 4,517,338 describes examples of oligonucleotide growth on CPG beads. The membrane can be made from any porous material that allows passage of waste materials, e.g., solvents. Examples of membrane materials include, but are not limited to, polymers and filter frits. Filter frits are available, for example, from Porex Bio Products Group, located in California. In general, the membrane is selected to have a bubble point pressure higher than the vacuum used for draining the reaction wells. Membranes with bubble point pressure sufficiently higher than the applied vacuum are required. A value for the applied vacuum is 10 in. Hg Vac and the bubble point pressures of the membranes are between 36.5 and 40.6 in. Hg. Examples of membranes having bubble point pressures higher than the vacuum applied for draining waste materials from the reaction wells include, but are not limited to, PTFE, PP, and filter frit membranes.

Figure 5:
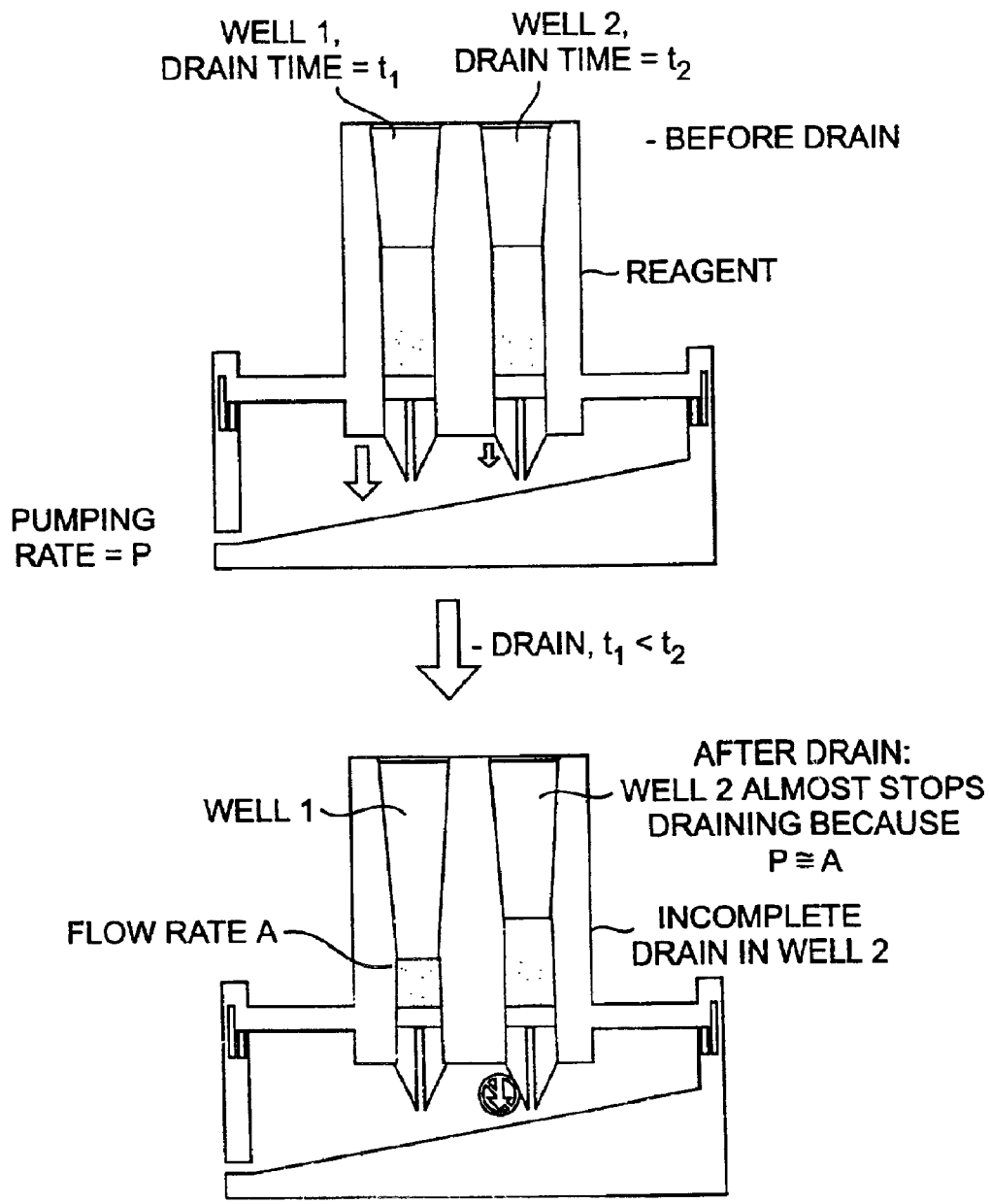
FIG. 5 is schematic diagram illustrating effects of gas flow rates on reaction well draining rates.

Referring to FIG. 5, two reaction wells are illustrated in this example but the principle is the same for multiple wells. Two reaction wells are shown in this example, with well 1 having a lower reagent volume and thus a shorter drain time of $t_1$ sec, while well 2 has a larger reagent volume and a longer drain time of $t_2$ sec, i.e., $$t_1 < t_2$$

Let the pumping flow rate be P l/min and the gas flow rates for well 1 and well 2 each be A l/min. During the draining process, waste flows through wells 1 and 2 at approximately the same flow rate. Due to minor differences in reagent volume in each well, well 1 empties first ($t_1 < t_2$), after which gas flows through well 1 at the rate of A. At this stage, different gas flow rates of the membrane affect the rate of draining well 2: (1) If A approaches zero or is negligible, the empty well 1 does not lower the suction head over well 2 and well 2 can be drained. (2) If A is not negligible and P>A, the suction head over well 2 is reduced because of large gas flow through well 1 at the flow rate A. Nevertheless, a high pumping rate maintains a weak, but sustainable, suction head over well 2, and well 2 can still be drained at the expense of a longer drain time and greater consumption of expensive argon gas. (3) If A is not negligible and P≡A, the suction head over well 2 approaches zero and the draining of well 2 takes an intolerably long time. If some wells are not drained completely before the addition of the next synthesis reagent, the residual waste interferes with the synthesis chemistry and results in lower product yield, zero yield, or unwanted side products. The draining problem exemplified in FIG. 5 illustrates that variation in the volume of dispensed reagents can result in synthesis yield variation and low product purity. To minimize this problem, the membrane is selected, as described above to possess a high bubble point pressure. Using such membranes, wells that drain faster than others do not allow gas flow-through and the suction head is maintained over those wells that still contain reagent, such that they can be drained completely, thereby minimizing yield variation. Membrane thickness may be about 100 to 200 microns and increasing the thickness of the membrane can control the gas flow rates.

In chemical syntheses utilizing lower reagent volumes, excess reagent does not always lead to a higher yield. For example, excess reagent can make the level of liquid in the well too high for adequate mixing. In general, the total reaction volume has to be less than about 16 microliters for efficient mixing. In oligonucleotide synthesis, especially at the coupling stage, in which three components, namely the synthesis support, the phosphoramidite, and tetrazole (coupling reaction activator) must be thoroughly mixed to allow efficient coupling, the limits of total volume restrict the volume of phosphoramidite to less than about 5 microliters per reagent ejection.

The volume for efficient mixing is arrived at as follows: (1) take a first synthesis colorful reagent (e.g., iodine solution, which is brown) and a second colorless reagent which does not react with the first reagent (e.g. $CH_3CN$); and, (2) eject the two different reagents into the same reaction well. If the resultant mixture becomes homogeneous immediately after ejection, i.e., the mixture in the well shows one color rather than two layers with different colors such as brown and clear, then the mixing is considered complete.

The limits of total volume above were also tested as follows: (1) eject 7 microliters of iodine solution (brown color) and 6 to 10 microliters of deoxyadenosine phosphoramidite (clear color); and, (2) observe the mixing behavior. When more than 8.5 microliters of $CH_3CN$ is added, the mixing is not immediate. Therefore, the total volume should be less than 16 microliters for efficient mixing.

During reagent delivery, the reagent ejection velocity also must be optimized to increase the synthesis yield. A high ejection velocity tends to spatter the synthesis support out of the reaction well, while a low ejection velocity results in reagent accumulation at the nozzle tip. Thus, as the ejection velocity increases, the coefficient of variation (CV) for the ejection volume reaches a minimum, but the spattered synthesis support height increases. The optimal ejection velocity is a balance between the two extremes of reagent accumulation at the nozzle tip and synthesis support spattering.

Figure 6:
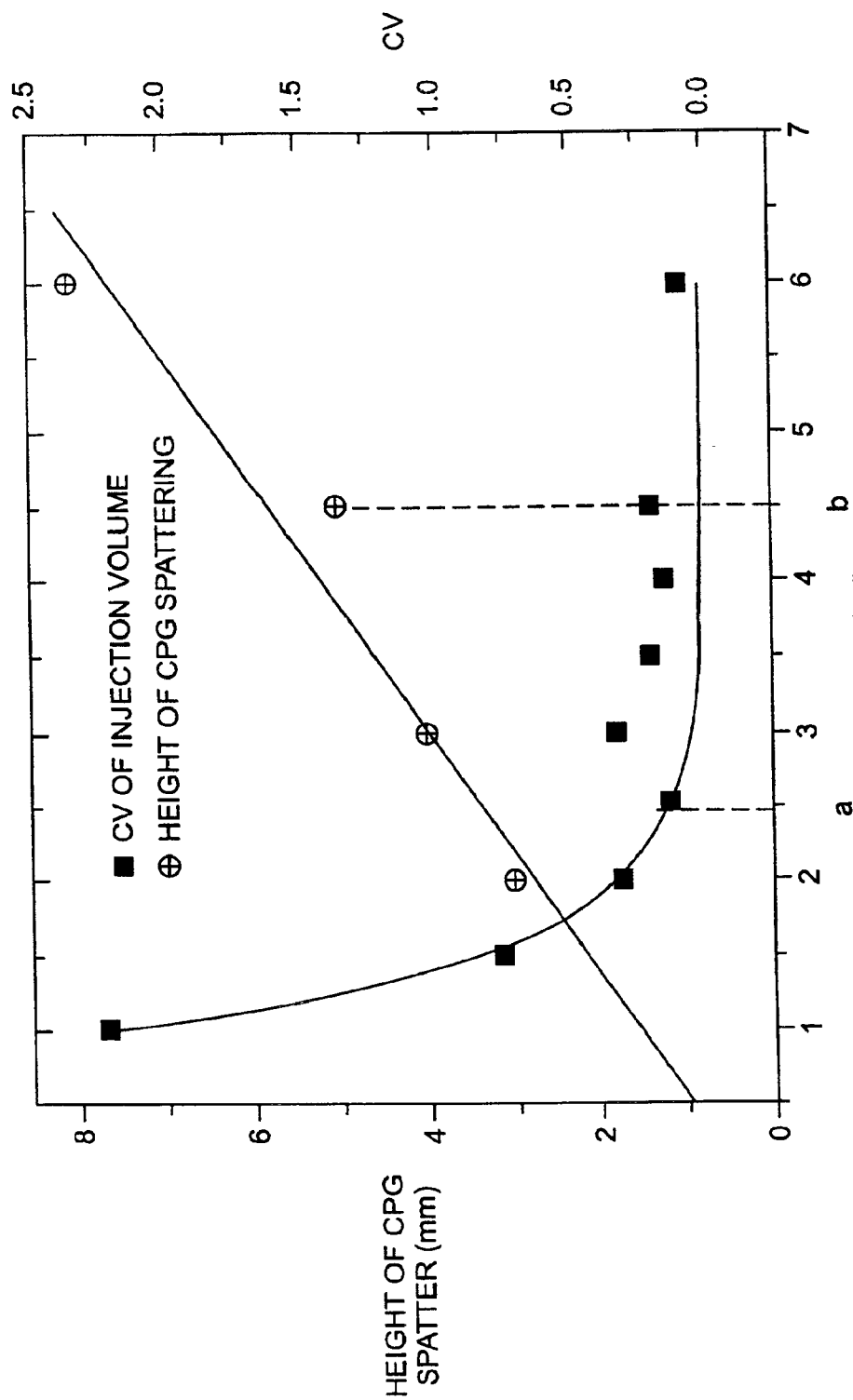
FIG. 6 is a plot of the coefficient of variation and spattering height versus ejection velocity.

Referring to FIG. 6, a graph shows the values of CV and spattering height as a function of ejection velocity (measured in pound per square inch (psi)). The synthesis support spattering height is proportional to ejection velocity, which is governed by the ejection pressure P, the flow resistance through the tubing, and the internal diameter of the nozzle. To determine the optimal ejection velocity, the CPU operator measures the CV for the ejection volume as a function of ejection velocity. In order to measure the ejection CV, the volume of each ejection is measured by its weight with a precision balance. Several consecutive ejections are measured and recorded and the average, standard deviation (SD) and CV are calculated. Since different reagents have different viscosities, the ejection velocity varies for different reagents at the same ejection pressure. The optimal ejection pressure for each individual reagent is determined as the minimal ejection pressure that results in no reagent accumulation at all the nozzle tips. For ejection velocity tuning, the ejection pressure is adjusted while keeping the other parameters unchanged. The other parameters can all be adjusted in a similar manner. The overall optimal ejection velocity, applicable to all the reagents, is then determined by choosing the ejection pressure resulting in no accumulation of any of the reagents at the nozzle tip.

The plot of CV as a function of ejection velocity for dispensing a reagent, such as trichloroacetic acid (TCA), shows that the CV increases as the ejection velocity decreases. The CV curve can be fitted to an exponential decay function given by the relationship:

$$y = A^* \exp[-(x-x_0)/t]$$

where y is the CV for the ejection volume, A is the amplitude and is equal to 2.2, $x_0$ is the offset and is equal to 1, t is the decay constant of the curve and is equal to 0.53. For delivery of TCA with a CV of 0.1, the ejection pressure is calculated to be $$(2.53^*t) + x_0 \equiv 2.5 \text{ (psi)}$$

The ejection pressure, indicated by a in FIG. 6, is the pressure that results in a CV of 0.1 for volume variation during TCA ejection. The ejection pressure for each reagent that results in a CV of 0.1 for that reagent can be determined. Once the ejection pressure is determined, the reaction well depth can be determined by measuring the synthesis support spattering height at the desired ejection pressure. For example, when taking average spattering height measurements of synthesis support during TCA ejections at a pressure of 4.5 psi (point b in FIG. 6), an average spattering height of 4.8±1.6 mm was obtained with a 99% confidence interval. In this case, reaction wells must have depth of at least 4.8 mm+1.6 mm, i.e., 6.4 mm.

Although deeper reaction wells help retain the synthesis support, they create another difficulty in minimizing synthesis yield variation. While the spattered synthesis supports are retained in the reaction wells having sufficient height, they stick to the inner wall of the reaction wells and must be washed down to the bottom of the well before the start of the next synthesis step to ensure adequate reaction efficiency. A larger spattering height corresponds to a larger rinse volume required to wash down the splattered synthesis supports which, in turn, results in greater reagent consumption, longer reagent delivery time, and longer draining time.

The volume required to wash down spattered synthesis supports can be calculated from the well internal diameter (e.g., 2.2 mm) and the spattering height. Experimental results (data not shown) show that the volume of $CH_3CN$ required to wash down spattered synthesis supports increases linearly with ejection velocity, resulting in increased waste and overall synthesis times.

The CPU contains a user-friendly program such as an executable written in Visual Basic (Microsoft) to perform the automated parallel synthesis. Based on the synthesis parameters entered by the user, the program computes and sends motion commands to the translation stages and ejection commands to the solenoid valves. Users provide sequence information in a plain text file. The computer program reads the information and carries out the synthesis process accordingly in a fully automatic way. When 384 reaction wells are not all used in a run, the program skips reagent injection in unused wells to save reagent. Users can easily enter synthesis parameters such as reagent injection volume, reaction time, and addition of modified bases. These parameters can be saved in a file for later use.

Figure 7:
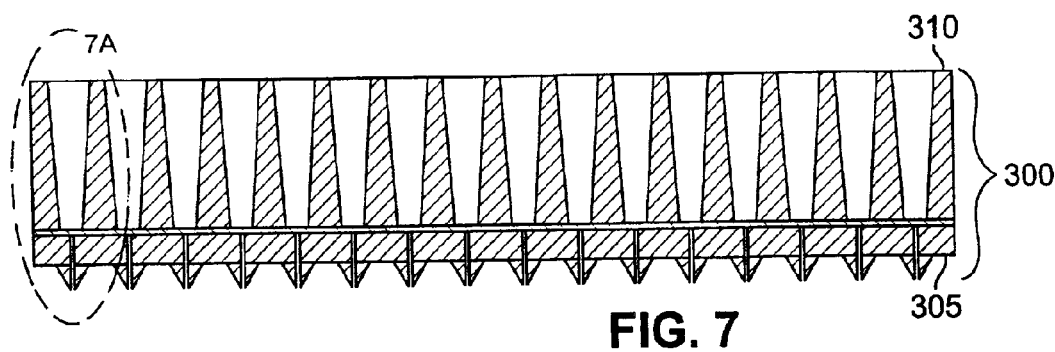
FIG. 7 is an alternative view of a plate assembly of the apparatus of FIG. 1.
Figure 7A:
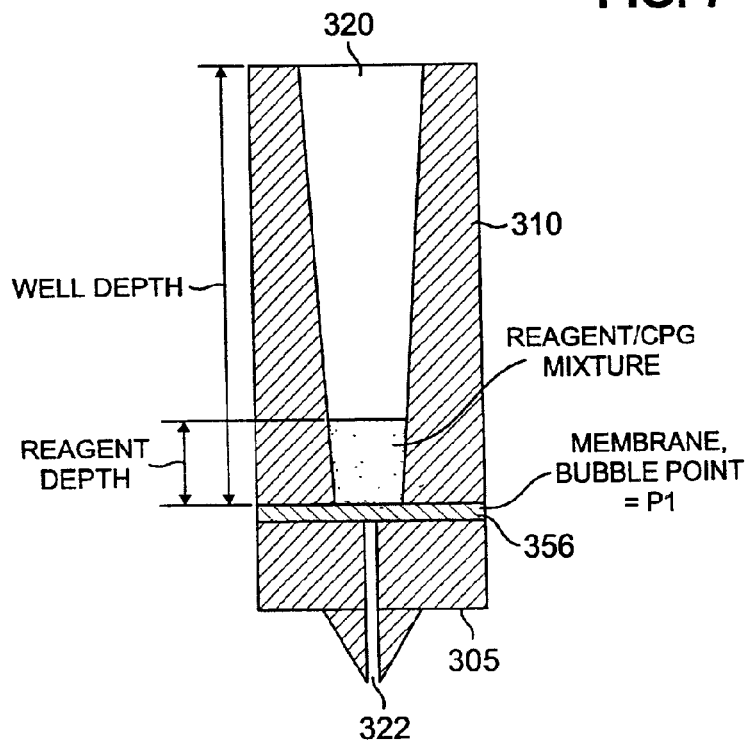

Referring to FIG. 7, in another embodiment, a plate assembly 300 includes a membrane 356 sandwiched between a base plate 305 and a top plate 310. Each base plate 305 and top plate 310 includes a plurality of openings 320 and 322 arranged in a 2-dimensional array. The openings of each plate are aligned to provide fluid communication between the top and base plates. Unlike plate 210 described above, the inner surface of the opening forms the conical body of the reaction wells. The membrane permits waste materials, such as reagents, to flow from each reaction well into an adjacent opening 322 in base plate 305.

EXAMPLE 1

Parallel synthesis of 384 oligonucleotides of different sequences and lengths was performed with the apparatus described above. The synthesis support, e.g., controlled pore glass (CPG) (Glen Research or Chemgenes), was suspended in chloroform/dibromomethane in a 1:1 (v/v) ratio before being dispensed to reaction wells by pipetting. The solvent was drained by applying vacuum to the reaction wells before synthesis. The phosphoramidites (Chemgenes or ABI) were dissolved in anhydrous acetonitrile (Aldrich, 0.001% water content), and the bottles containing the phosphoramidites were attached to the synthesizer. The synthesizer chamber was then purged with argon gas for 30 min before synthesis took place.

The phosphoramidite synthesis chemistry consists of four stages, namely de-blocking, coupling, capping and oxidation. The synthesis parameters in this example were as following: For de-blocking, 40 $\mu$l of TCA were injected to each well, followed by 110 $\mu$l $CH_3CN$ wash. For the coupling stage, to ensure highest achievable coupling efficiency, the coupling reaction was performed twice with 4 $\mu$l phosphoramidite and 8 $\mu$l tetrazole each time. Each reaction was given 60 sec before the reagents were drained. 5 $\mu$l of capping reagent was then injected to each well. The reaction was given 20 sec before the reagent was drained. 5 $\mu$l of the oxidation reagent was then delivered to each reaction well. The reaction was given 30 sec before the reagent was drained. Because of the diameter of the reaction well (~2.2 mm), 5 $\mu$l of reagent was sufficient to cover the CPG beads at each step. After the oxidation stage, the reaction wells were washed with $CH_3CN$ and the synthesis reaction recycled again starting from the de-blocking stage.

After the synthesis was completed, the reaction wells were washed extensively with acetonitrile ($CH_3CN$) to remove residual reagents in the reaction wells. The oligonucleotides were cleaved from the solid support, the CPG beads, by injecting 60 $\mu$l of alkaline solution (32% ammonium hydroxide or 40% methylamine, depending upon the CPG beads used) to each well. The reaction proceeded at room temperature for 5 to 60 min. The reaction plate assembly was then mounted on a polypropylene collection plate and the two plates were placed in a centrifuge to spin down the crude product. The collection plate was then sealed and incubated at 55° C. for 8 hours to remove the protecting groups on the oligonucleotide molecules. The plate was then cooled to room temperature before the seal was removed. The crude products were dried in a vacuum chamber, redissolved in deionized water and ready for use. Oligonucleotides can be dried by an alternative method. The n-butanol extraction has been shown to yield oligonucleotides of sufficient quality for PCR, sequencing, and others. A description of n-butanol extraction is found in *Nucleic Acid Research*, M. Sawadogo et. al., 1991, vol. 19, page 674.

The reaction plate assembly can be re-used several times without degrading the quality of synthesis products. The used reaction plate assembly was first immersed in acetone and sonicated for 30 min. Each well was washed with 400 $\mu$l acetonitrile, 60 $\mu$l of deionized water, acetonitrile, and 40% methylamine, consecutively. The UV absorption of the eluent from each well was measured at 260 nm to be ~0.01 which was about the same for the solvents. Therefore, the aforementioned process can be used to recycle the reaction plate assembly.

To measure the purity of synthesized oligonucleotides, high performance liquid chromatography (HPLC) was performed with a reverse phase C8 column. The HPLC system consisted of two Shimadzu LC-6A pumps, a SCL-6A for pump control and a SPD10A photodiode array as the detector. A personal computer was used to control the HPLC system and to obtain chromatograms. UV-Vis absorption spectra of the analytes were monitored in real-time to assist peak identification. The mobile phase of HPLC separation was composed of reagent A: 0.1 M triethyl acetic acid (TEAA) and reagent B: acetonitrile. The elution gradient of reagent B was started at 8%, linearly increased with time to 20% at 24 min, and to 40% at 34 min. The full-length oligonucleotide product was eluted at around 30 min and failure sequences were eluted between 14–18 min.

To measure synthesis yield, oligonucleotides synthesized in 384-well plates were transferred to 384-well UV-transmissible plates (Greiner, Frickenhausen, Germany; Cat. No. 781801) and their absorbance spectrum over the range of 200 to 400 nm measured using a multi-well spectrophotometer (SpectraMax Plus 384; Molecular Devices, Sunnyvale, Calif.). Absorbance at 260 nm, 280 nm, and 320 nm were used to evaluate the final product quantity. The results showed that oligonucleotides were present in every well in the plate. No CPG bead loss occurred during synthesis and no synthesis failure was observed. The actual product yield was ~6 nmol on average for 384 oligonucleotides synthesized at a 5 nmol nominal scale. The coefficient of variation (CV) for well-to-well yield variation was measured to be 23%. When the same apparatus was loaded with 96-well reaction plate, a smaller CV of 15% in yield was observed. By comparison, the prior art synthesized oligonucleotides in 96-well format with 23%–25% CV. These findings illustrate first, that it is non-trivial to raise reaction well density 4 fold, i.e., from 96-well to 384-well format, without compromising the variations in yields. Second, using the method described in this invention one achieves lower well-to-well yield variation than with currently available parallel synthesizers.

The step yield of the synthesis was calculated by the ratio of full-length product yield to the total product yield. The average step yield of an oligonucleotide of n nucleotides in length is calculated according to the formula when universal CPG beads are used:

$$\phi=[N_F/N_T]^{1/n}$$

where $N_T$ and $N_F$ are yields of total and full-length product, respectively. The quantities can be determined by reverse-phase HPLC. To measure step yield, 384 oligonucleotides of $dT_9$ sequence were synthesized at a scale ranging from 5 nmol to 20 nmol in a run. Total products were selected randomly from several wells. The relative yields of total and full-length sequences were determined by HPLC. FIG. 8 shows several HPLC chromatograms of products from different wells. Average step yield in each well was calculated and shown by each chromatogram. Step yield greater than 99% was achieved for synthesis scale no greater than 10 nmol. Well-to-well variation in step yield was negligible. Since the apparatus was optimized for large variety but small quantity oligonucleotide synthesis, it was not surprising that for 20 nmol synthesis scale lower step yield was obtained. The results demonstrate that synthesis parameters need to be optimized for different scales of synthesis.

EXAMPLE 2

The throughput of the synthesizer can be increased by using multiple reagent delivery systems with only one synthesis plate translation control system. A 1536-channel (384×4) synthesizer was constructed by using one set of reagent reservoirs, one translation control system, four synthesis assemblies, and 4 sets of solenoid valves and nozzles for reagent delivery as described in EXAMPLE 1 for the 384-channel synthesizer. To add an additional synthesis assembly for a 12-reagent synthesis process, 12 additional reagent delivery solenoid valves and 3 additional reagent distribution valves are needed. Compared with the conventional systems that require about 100 additional solenoid valves for each additional module. This invention is more flexible in adding additional synthesis modules for throughput enhancement relative to conventional parallel synthesis apparatuses.

To achieve the goal of high-throughput, low cost production, a parallel 1,536-channel oligonucleotide synthesizer capable of synthesis on the 5 nanomole scale was designed and constructed. The synthesis chemistry is essentially the same as described in Example 1. The 1,536-channel synthesizer consists of four 384-channel synthesis modules. As depicted in FIG. 2, each module consists of three major components: (1) A reaction plate assembly and vacuum assembly: a tailor-made 384-well microplate assembly compatible with the standard microplate format serves as a reaction cartridge in which each well is an independent reaction vessel. After each synthesis step, the wells are drained by a vacuum pump. (2) A reagent reservoir and tubing: a set of 12 or more reagent bottles hold the reagents, which are transported by Teflon tubing from the bottles to the reagent valve assembly. (3) A reagent valve assembly: a set of solenoid valves, ejection nozzles, and a fast-response driving circuit are integrated to allow the ejection volume to be adjusted to as little as 2 µl per ejection. All reagent nozzles are arranged in order and assembled on a nozzle mount. The mount is designed to hold 20 different nozzles and is fixed to one of the translation stages. The current design uses 12 valves in each module so that, in addition to the deoxyribonucleoside phosphoramidites (A, G, C, and T), two additional labeling reagents, aminolink (ABI, 402872) and C18-spacer (ChemGenes CLP-9765), can be used.

All four 384-well synthesis modules were mounted on a translation stage and the nozzle mounts are seated on another translation stage. The two translation stages together make up a two-dimensional (2-D) travel device that allows the nozzles to access all the reaction plate assemblies. A software program, written in Microsoft Visual Basic and run on an IBM-compatible computer using the Windows 98 operating system, controls the 2-D reagent delivery system. The 2-D motion control system moves the microplate underneath the nozzles for accurate delivery of individual reagents into the 1,536 reaction wells. On the basis of the synthesis parameters entered by the user, the program computes and sends motion commands to the translation stages and injection commands to the solenoid valves. Users provide sequence information as a plain text file, and then the computer program reads the information and carries out the synthesis in a fully automatic way. When fewer than 1,536 reaction wells are used in a run, the program skips reagent ejection into unused wells to avoid wasting reagents. Users can easily enter synthesis parameters such as reagent ejection volume, reaction time, and addition of modified bases.

The 1,536-channel synthesizer is a compact benchtop device. The four synthesis modules, nozzles, and translation stages were placed in an airtight box under a positive argon pressure of 0.5 psi to provide an inert atmosphere for synthesis. The 384-well reaction plate assembly consists of a plate to hold 384-independent tapered pipette tips fitted with filter frits (Porex Bio Products Group, CA, Cat. No. FA113-N-20) or a plate fitted with high bubble point pressure membrane as aforementioned.

Reagent consumption for each cycle of deoxyribonucleotide addition per synthesis well is shown in Table 1. Each cycle of deoxyribonucleotide addition takes 30 minutes and the synthesis of 20-mer oligonucleotides is completed in about 10 hours.

TABLE 1

Reagent consumption per synthesis cycle in each reaction well

| Reagent | Quantity |
|---|---|
| Phosphoramidites | 8 µl ≅ 0.36 mg |
| Activators (tetrazole) | 16 µl ≅ 0.50 mg |
| Capping solution | 5 µl |
| Oxidizer | 5 µl |
| Deblocking solution | 39 µl |
| Acetonitrile | 260 µl |
| Total waste per cycle | 330 µl |

After synthesis, several procedures, including cleavage and deprotection, were performed before the product was used. The post-synthesis procedures are the same as described in Example 1.

A number of embodiments of the invention have been described. Nevertheless, it will be understood that various modifications may be made without departing from the spirit and scope of the invention. Accordingly, other embodiments are within the scope of the following claims.

What is claimed is:

1. A method of conducting parallel chemical synthesis comprising:
   determining an optimal ejection velocity for dispensing a plurality of fluids through a supply assembly into reaction wells of a synthesis apparatus by measuring a set of coefficients of variation and a set of synthesis support spattering heights for each of the fluids as a function of ejection pressure to derive an optimal ejection pressure at which both reagent accumulation and synthesis support spattering height are minimized for dispensing the fluids wherein a maximal optimal ejection pressure applicable for all of the fluids defines the optimal ejection velocity for dispensing each individual fluid, dispersing the fluids via the supply assembly at the determined optimal ejection velocity into the reaction wells of a synthesis apparatus, and reacting the fluids within the reaction wells.

2. The method of claim 1, wherein the reaction wells each have a synthesis reaction medium which includes a synthesis support disposed on a membrane through which reagents are drained with a gas flow rate lower than a pumping rate, where the gas flow rate is the rate at which an inert gas passes through the reaction wells and the pumping rate is the rate at which a pumping assembly of the synthesis apparatus operates.

3. The method of claim 2, wherein the dispensed fluids are reactants, said synthesis apparatus is a parallel synthesis plate, and each of the wells is defined by a bore extending from a first end to a second end of each well, includes the synthesis reaction medium disposed within the well between the first and second ends, and has an opening at the first end having an inner diameter of about 3.5 mm or less, an inner diameter at the synthesis reaction medium closest to the second end of about 3.0 mm or less, and each of the wells are arranged i a z-dimensional array such that the wells are spaced apart from neighboring wells center-to-center by about 4.5 mm or less; and the supply assembly includes at least one valve for dispensing fluids through a nozzle, the valve and nozzle together configured to provide fluids to wells in volumes as small as about 2 microliters.

4. The method of claim 3, wherein the nozzle is made from a material having a surface energy of about 20dynes/cm or less and has a de-burred tip.

5. The method of claim 3, wherein the synthesis is carried out on synthesis supports retained by a porous membrane.

6. The method of claim 5, wherein the membrane has a bubble point pressure above 10 in. Hg, the bubble point pressure being a differential gas pressure at which the first steady stream of gas bubbles are emitted from the membrane when immersed in a liquid.

7. The method of claim 5, further comprising draining each of the wells via a pumping assembly, wherein the pumping assembly is in communication at the second end of the wells for applying a vacuum thereto, and the membrane has a bubble point pressure higher than the applied vacuum, the bubble point pressure being a differential gas pressure at which the first steady stream of gas bubbles are emitted from the membrane when immersed in a liquid.

8. The method of claim 1 further comprising performing chemical synthesis in the wells on a reaction scale of less than about 20 nanomole.

9. The method of claim 8 further comprising performing chemical synthesis in the wells on a reaction scale of less than about 10 nanomole.

10. The method of claim 9 further comprising performing chemical synthesis in the wells on a reaction scale of less than about 5 nanomole.

11. The method of claim 3 further comprising performing chemical synthesis in parallel in more than about 100 wells.

12. The method of claim 11 further comprising performing chemical synthesis in parallel in more than about 300 wells.

13. The method of claim 12 further comprising performing chemical synthesis in parallel in more than about 1,000 wells.

* * * * *